United States Patent [19]
Shio

[11] 3,971,599
[45] July 27, 1976

[54] RECTILINEARLY GUIDING DEVICE

[75] Inventor: Megumu Shio, Kanagawa, Japan

[73] Assignee: Nippon Kogaku K.K., Tokyo, Japan

[22] Filed: Jan. 21, 1975

[21] Appl. No.: 542,704

[30] Foreign Application Priority Data
Jan. 31, 1974  Japan............................ 49-12175

[52] U.S. Cl................................. 308/3 A; 308/6 R
[51] Int. Cl.$^2$................................. F16C 29/04
[58] Field of Search............ 308/3 R, 3 A, 3 C, 3.6, 308/3.8, 6 R; 350/84, 86; 312/337, 339, 340, 341 R; 267/161, 158, 159, 160, 163

[56] References Cited
UNITED STATES PATENTS

| | | | |
|---|---|---|---|
| 83,213 | 10/1868 | Sanders............................ | 267/161 X |
| 1,429,557 | 9/1922 | Bauer............................... | 350/84 |
| 2,400,374 | 5/1946 | Selnes.............................. | 308/6 R |
| 2,607,636 | 8/1952 | Michelsen......................... | 308/6 R |
| 2,771,591 | 11/1956 | Vordtriede........................ | 267/161 X |

Primary Examiner—Frank E. Werner
Assistant Examiner—Randolph A. Reese
Attorney, Agent, or Firm—Fitzpatrick, Cella, Harper & Scinto

[57] ABSTRACT

In a device for rectilinearly guiding a stage carrying thereon a sample, a stationary race is integrally formed with a stationary member and has at least two surfaces forming a certain angle with each other. A movable race is provided and movable with the stage in a predetermined direction with respect to the stationary member, and has at least two surfaces opposed to the surfaces of the stationary race, respectively. A drive assembly is provided for driving the stage-moving movable race. Stage-moving sliders comprising a plurality of roll bearings and base plates supporting the bearings are disposed between the opposed surfaces of the stationary race and the stage-moving movable race. Pressing elements are provided for causing the opposed surfaces of the stationary race and the movable race to impart pressure forces to the roll bearings simultaneously.

14 Claims, 7 Drawing Figures

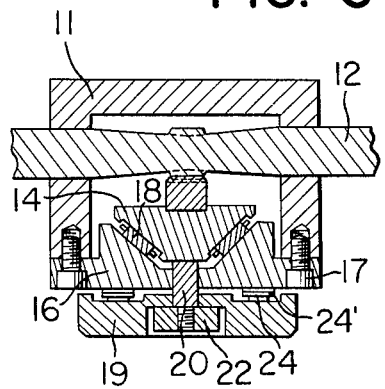
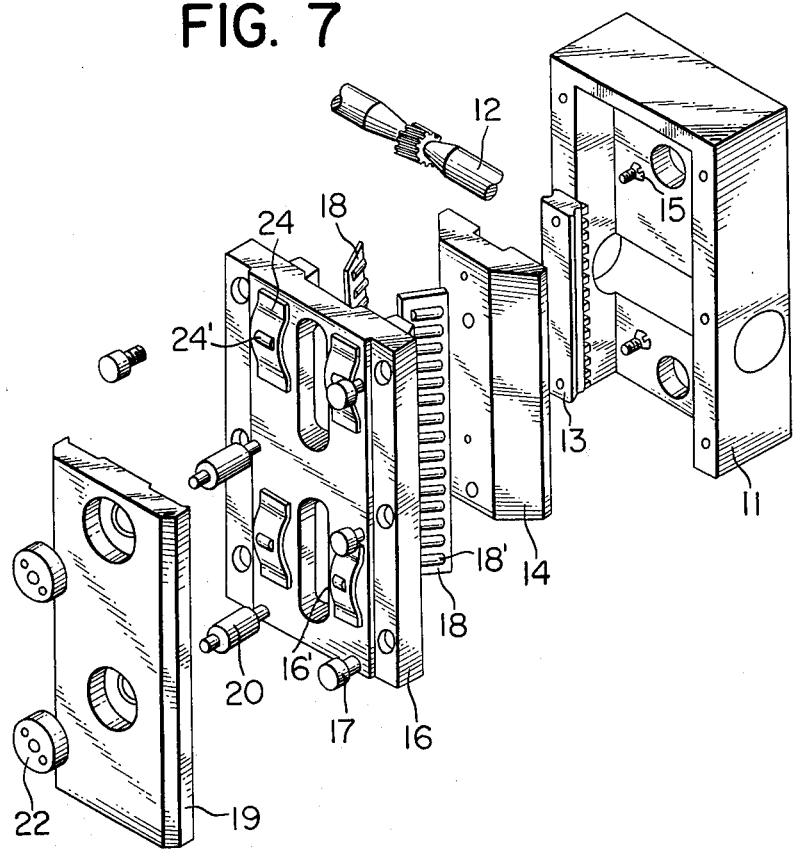

RECTILINEARLY GUIDING DEVICE

BACKGROUND OF THE INVENTION

1. Field of the Invention

This invention relates to a guiding device for rectilinearly or vertically moving the stage of a microscope or other measuring instrument.

2. Description of the Prior Art

As a guiding device for rectilinearly or vertically moving the stage of a microscope or the like, there has heretofore been such a one as shown in FIG. 1 of the accompanying drawings.

The guiding device of the prior art will hereinafter be described with respect to its application for a microscope. In the horizontal sectional view of FIG. 1 and the side sectional view of FIG. 2 both showing the prior art device, a pinion supporting metal mount 1 is fixedly secured to the tube of a microscope and shaped in the form of a box having openings formed through the opposite side walls thereof. A pinion 2 is rotatably fitted in the openings. A rack 3 is formed to mesh with the pinion 2 and secured to a movable race 4. The opposite side surfaces of the race 4 which do not contain that surface of the race to which the rack 3 is secured are formed into V-shaped grooves, respectively. Stationary race 5 is secured to the corresponding ends of the pinion supporting metal mount 1 by means of screws 7, and the side surfaces of the stationary race which oppose the V-shaped grooves of the movable race 4 are formed into similar V-shaped grooves. A plurality of steel balls 6 are disposed in each of the clearances defined by the V-shaped grooves of the stationary and movable races 5 and 4. A stage 8 is secured to the movable race 4. Thus, rotation of the pinion 2 will result in vertical movement of the rack 3 in engagement therewith, and accordingly vertical movement of the stage 8. The vertical movement of the stage 8 can occur with the aid of the steel balls disposed in the clearances defined by the V-shaped grooves of the movable and stationary races 4 and 5.

In such type of rectilinearly guiding device, the steel balls 6 disposed between the movable race 4 and the stationary race 5 have so much limited areas of contact that the surfaces of the V-shaped grooves contacted by these steel balls are subject to elastic deformation. This means that a manual force applied to the stage 8 in the direction of arrow P to displace a sample on the stage 8 causes the optical axis 9 of the stage to be displaced as much as several tens of microns, thus greatly impeding the measurement or observation. Also, where a device such as a photographic device having a source of vibration (the shutter is such source) is attached to the main body of the microscope or measuring instrument, the limited areas of contact of the steel balls attenuate the vibration and in the case of a microscope, this would lead to a difference in amplitude between the vibration of the objective lens and that of the stage, which in turn would result in blur that would adversely affect the picture-taking effect.

SUMMARY OF THE INVENTION

It is an object of the present invention to provide a novel guiding device which overcomes the above-noted various disadvantages peculiar to the above-described device of the prior art, or which eliminates the possibility of the center of the stage being deviated from the optical axis by manual touch or the possibility of the center of the stage being vibrated with respect to the optical axis by vibration.

According to the present invention, there is provided a device for rectilinearly guiding a stage carrying thereon a sample which comprises a stationary member, a stationary race integrally formed with the stationary member and having at least two surfaces forming a certain angle with each other, a movable race movable with the stage in a predetermined direction with respect to the stationary member and having at least two surfaces opposed to the surfaces of the stationary race, respectively, means for driving the stage-moving movable race, stage-moving sliders comprising a plurality of roll bearings and base plates supporting the bearings, the sliders being disposed between the opposed surfaces of the stationary race and the stage-moving movable race, and pressing means for causing the opposed surfaces of the stationary race and the movable race to impart pressure forces to the roll bearings simultaneously.

Other objects and features of the present invention will become fully apparent from the following detailed description of some embodiments of the invention taken in conjunction with the accompanying drawings.

BRIEF DESCRIPTION OF THE DRAWINGS

FIGS. 6 and 7 are a horizontal sectional view and a perspective view, respectively, of a third embodiment.

DESCRIPTION OF THE PREFERRED EMBODIMENTS

Figure 3:
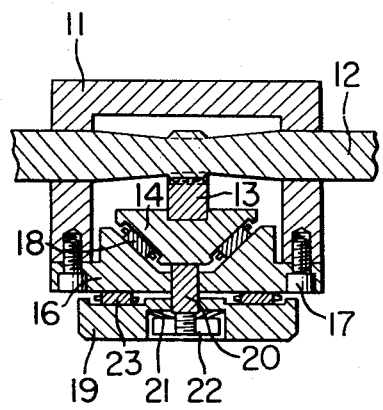
FIGS. 3 and 4 are a horizontal sectional view and a perspective view, respectively, of the rectilinearly guiding device according to a first embodiment of the present invention.
Figure 4:
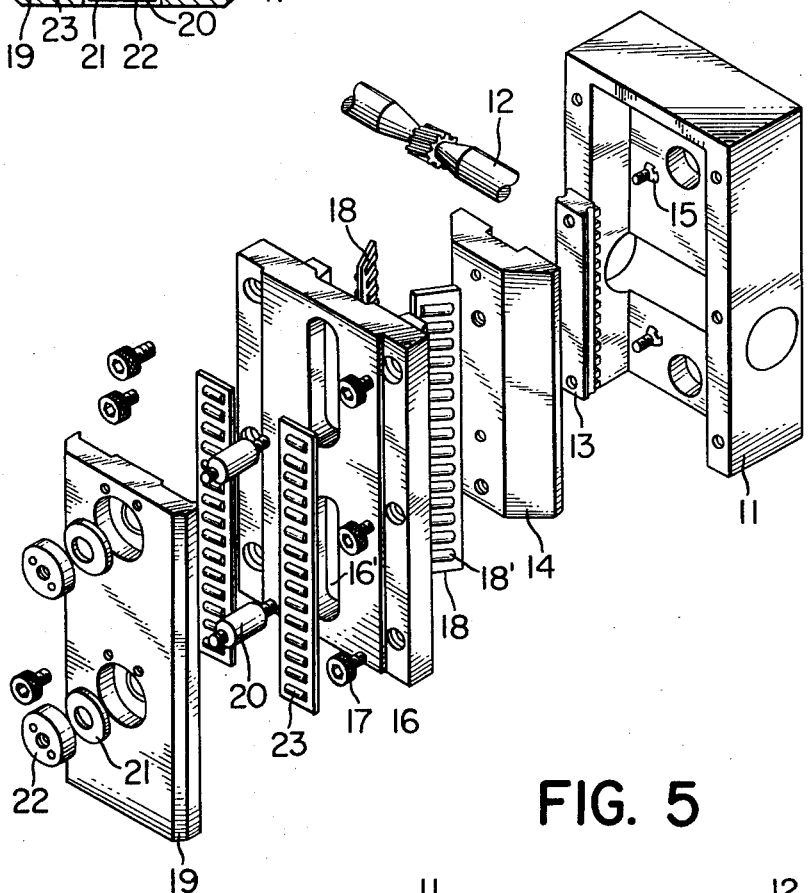

Referring to FIGS. 3 and 4, numeral 11 designates a pinion supporting metal mount similar to that already described in connection with the prior art. Designated by 12 is a pinion rotatably fitted in the openings formed through the opposite side walls of the pinion supporting metal mount 11. The pinion 12, as shown in FIG. 4, has teeth formed only in the middle portion thereof for performing the function as pinion. A rack 13 meshes with the pinion 12 and is vertically movale with rotation of the pinion 12. A movable race 14 is provided for moving a stage and, in the present embodiment, it is of triangular cross-section. The rack 13 is secured to the movable race by means of set screws 15. Designated by 16 is a stationary race. This stationary race 16 has one side surface thereof formed into a V-shape complementary to the triangular movable race 14 and the other side surface formed as a flat one, and also has two oblong slots 16' formed along the center line thereof. The V-shaped stationary race 16 is secured to the pinion supporting metal mount 11 by means of set screws 17. A slider 18 is disposed between each of the clearances defined by the sloped surfaces of the V-shaped stationary race 16 and the triangular movable race 14. Each slider 18 comprises a plurality of rollers 18' and is designed such that the triangular movable race 14 is vertically movable relative to the V-shaped stationary race 16 by means of the sliders 18. Designated by 19 is a pressing movable race provided so that the respective surfaces of the triangular movable race 14 and the V-shaped stationary race 16 always urge against the rollers 18'. In the present embodiment, the pressing movable race 19 is in a planar form. The planar movable race 19 is integrally connected to the triangular movable race 14 by connecting shafts 20. These connecting shafts 20 pass through the oblong slots 16' formed through the V-shaped stationary race 16 along the center line thereof and connect the triangular movable race 14 and the planar movable race 19. Sliders 23 are disposed between the opposed surfaces of the planar movable race 19 and the V-shaped stationary race 16. These sliders 23 are similar to the sliders 18 disposed between the V-shaped stationary race 16 and the triangular movable race 14. The planar movable race 19 and the connecting shafts 20 are precision-fitted together and secured together by means of bevel springs 21 and round screws 22. The bevel springs 21 are designed to create and determine the pressure forces of the triangular movable race 14 and the V-shaped stationary race 16 imparted to the roll bearings 18' of the sliders 18, as well as the pressure forces of the V-shaped stationary race 16 and the planar movable race 19 imparted to the roll bearings of the sliders 23, and also to determine the operating torque of the rectilinearly guiding device. As unshown stage is secured to the planar movable race 19.

Figure 5:
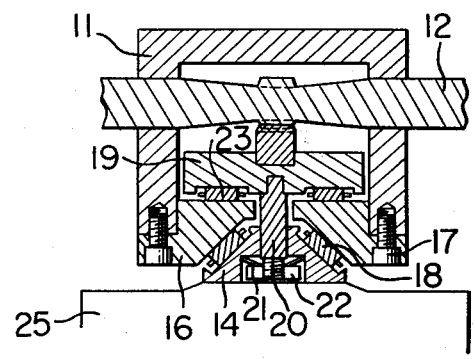
FIG. 5 is a horizontal sectional view showing a second embodiment of the present invention.

FIG. 5 shows a second embodiment of the present invention, which differs from the embodiment of FIGS. 3 and 4 in that (i) the stage-moving movable race, namely, the triangular movable race is disposed outwardly of the stationary race, (ii) the stationary race is disposed with its V-shaped surfaces opposed to the triangular movable race, (iii) the pressing or planar movable race is disposed between the fixed member and the stationary race, and (iv) the rack is provided on the planar movable race. Numeral 25 designates a stage secured to the triangular movable race.

In FIGS. 6 and 7 which show a third embodiment, the connecting shafts 20 each have one end secured to the triangular race 14 and the other end secured to the planar movable race 19 by means of round screw 22. In other words, the triangular movable race 14, the connecting shafts 20 and the planar movable race 19 are formed integrally (in this point, the third embodiment differs from the embodiment in which bevel springs are provided). Plate springs 24 are provided on the V-shaped stationary race 16 and normally bias the planar movable race 19 outwardly but do not interfere with vertical movement of this race 19. In the other points, the third embodiment is similar to the embodiment of FIGS. 3 and 4. Again in the embodiment of FIGS. 6 and 7, the triangular movable race 14 and the V-shaped stationary race 16 are provided with respective pressure forces against the roll bearings 18' during sliding movement and stoppage of the triangular movable race 14.

In any of the described embodiments, the stage need not always be secured to the planar movable race 19 but instead, may be secured to the triangular movable race.

The pressing means will suffice if it provides the stage-moving movable race and the stationary race with respective pressure forces against the stage-moving roll bearings, and it will be apparent that the spring members may be provided on whichever member. In the first embodiment shown in FIGS. 3 and 4, the openings therethrough permitting therethrough axial movement of the connecting shafts, and the spring members are all provided in the pressing movable race. In such embodiment, however, the openings and the springs may alternatively be formed and provided, respectively, in the stage-moving movable race. Also, in the second embodiment of FIG. 5, the openings for permitting therethrough axial movement of the connecting shafts, and the spring members are formed and provided, respectively, in the stage-moving movable race. In such embodiment, however, these openings and spring members may alternatively be formed and provided, respectively, in the pressing movable race. Further, as shown in the embodiment of FIGS. 6 and 7, the spring members may be provided on the stationary race.

Operation of the present invention will now be described with respect to the first embodiment. Clockwise rotation of the pinion 12 causes the rack 13 meshing therewith to be moved upwardly. The upward movement of the rack 13 also moves the triangular movable race 14 upwardly. This in turn causes the planar movable race 19 integrally connected to the race 14 by the shafts 20 to be moved upwardly, thus moving the stage upwardly. To move the stage downwardly, the pinion 12 may be rotated counter-clockwise.

Figure 1:
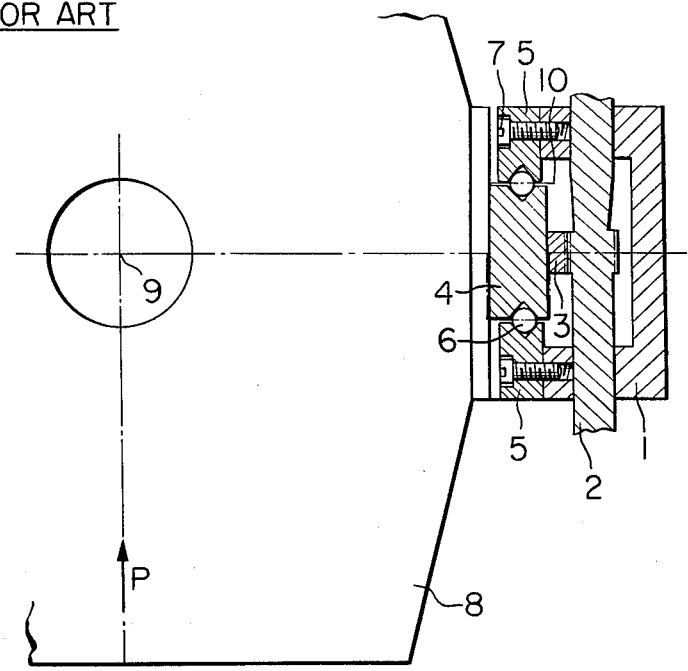
FIGS. 1 and 2 are a horizontal sectional view and a side sectional view, respectively, of the rectilinearly guiding device according to the prior art used with a microscope or other measuring instrument.
Figure 2:
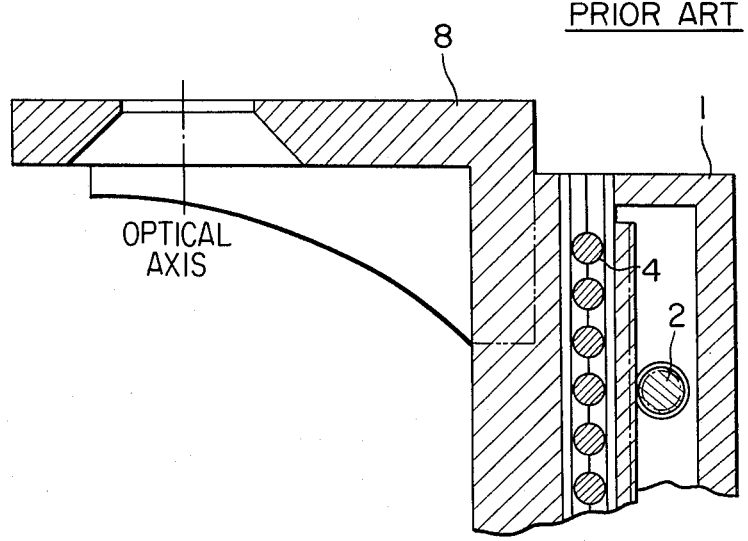

According to the present invention, as described above, there is provided a stationary race having at least two surfaces non-parallel to each other, a stage-moving movable race upwardly movable relative to said stationary race and having at least two surfaces opposed to said surfaces of said stationary race, and sliders including roll bearings making pressure-contact with the opposed surfaces of said stationary race and said stage-moving movable race. Thus, when a force in the direction of arrow P in FIG. 1 is exerted on the stage, there is created a reaction force for preventing the stage from deviating from the optical axis, and the areas of contact between the bearings and the stage-moving movable race and the pressing movable race are increased to greatly reduce the elastic deformation of the surfaces of the respective races connected by the bearings. This in turn prevents the center of the stage from deviating from the optical axis even if a load in the direction of arrow P indicated in FIG. 1 is exerted on the center of the stage.

Further, even when a device like a photographic device having a shutter or other source of vibration is attached to the main body of a microscope or other measuring instrument, the increased areas of contact between the rollers and the movable races will serve to transmit the vibration of the shutter or the like without attenuating such vibration, thus eliminating the possibility of such vibration causing vibration of the stage with respect to the viewing optical axis. This will ensure accomplishment of accurate picture-taking. The increased areas of contact are also useful to prevent creation of indentations in the surfaces of the movable races which would occur due to concentrated stress as when steel balls are employed. Furthermore, operating torque for the rectilinear movement can be freely adjusted.

I claim:

1. A device for rectilinearly guiding a stage for carrying thereon a sample, comprising:

a. a stationary member;

b. a stationary race integrally formed with said stationary member and having at least two surfaces forming a certain angle with each other;

c. a movable race movable with said stage in a predetermined direction with respect to said stationary member and having at least two surfaces opposed to said surfaces of said stationary race, respectively;

d. means for driving said movable race;

e. stage-moving sliders comprising a plurality of roll bearings and base plates supporting said bearings, said sliders being disposed between said opposed surfaces of said stationary race and said stage-moving movable race; and f. resilient pressing means for causing said opposed surfaces of said stationary race and said movable race to impart pressure forces to said roll bearings simultaneously.

2. A device according to claim 1, wherein said surfaces of said stationary race form a V-shape.

3. A device according to claim 1, wherein said movable race is disposed between said stationary race and said stationary member, and said pressing means comprises:

a. a connecting shaft having one end secured to said stage-moving movable race;

b. a pressing movable race formed with an opening for permitting therethrough axial movement of the other end of said connecting shaft, said pressing movable race being provided outwardly of said stationary race and movable thereon with said stage-moving movable race;

c. pressing sliders comprising a plurality of roll bearings and base plates supporting said roll bearings, and disposed between said pressing movable race and said stationary race; and d. a spring member provided on said pressing movable race to bias the same so that said stage-moving movable race and said stationary race respectively create pressure forces against said roll bearings therebetween and that said stationary race and said pressing movable race respectively create pressure forces against said roll bearings therebetween.

4. A device according to claim 3, wherein said spring member provided on said pressing movable race comprises a bevel spring and a round screw, said round screw being secured to one end of said connecting shaft, said bevel spring being disposed between said round screw and said pressing movable race, whereby said stage-moving movable race and said stationary race respectively create pressure forces against said stage-moving roll bearings, and said stationary race and said pressing movable race respectively create pressure forces against said pressing roll bearings.

5. A device according to claim 3, wherein said stage is secured to said pressing movable race.

6. A device according to claim 3, wherein the biasing force of said spring member provided on said pressing movable race is adjustable.

7. A device according to claim 1, wherein said stage-moving movable race is disposed between said stationary race and said stationary member and has an opening formed therein, and said pressing means comprises:

a. a pressing movable race provided outwardly of said stationary race;

b. a connecting shaft having one end secured to said pressing movable race and the other end axially movably disposed in said opening of said stage-moving movable race, said connecting shaft being for moving said pressing movable race with said stage-moving movable race on said stationary race;

c. pressing sliders comprising a plurality of roll bearings and base plates supporting said roll bearings, and disposed between said pressing movable race and said stationary race; and d. a spring member provided on said stage-moving movable race to bias the same so that said stage-moving movable race and said stationary race respectively create pressure force against said roll bearings therebetween and that said stationary race and said pressing movable race respectively create pressure forces against said pressing roll bearings.

8. A device according to claim 1, wherein said stage-moving movable race is formed with an opening and disposed outwardly of said stationary race, and said pressing means comprises:

a. a pressing movable race provided between said stationary member and said stationary race;

b. a connecting shaft having one end secured to said pressing movable race and the other end axially movably disposed in said opening of said stage-moving movable race, said connecting shaft being for moving said pressing movable race with said stage-moving movable race on said stationary race;

c. pressing sliders comprising a plurality of roll bearings and base plates supporting said roll bearings, and disposed between said pressing movable race and said stationary race; and d. a spring member provided on said pressing movable race to bias the same so that said stage-moving movable race and said stationary race respectively create pressure forces against said stage-moving roll bearings and that said stationary race and said pressing movable race respectively create pressure forces against said pressing roll bearings.

9. A device according to claim 8, wherein said driving means comprises a pinion rotatably supported by said stationary member, and a rack secured to said pressing movable race and meshing with said pinion.

10. A device according to claim 1, wherein said stage-moving movable race is disposed outwardly of said stationary race, and said pressing means comprises:

a. a pressing movable race provided between said stationary member and said stationary race and formed with an opening;

b. a connecting shaft having one end secured to said stage moving movable race and the other end axially movably disposed in said opening of said pressing movable race, said connecting shaft being for moving said pressing movable race with said stage-moving movable race on said stationary race;

c. pressing sliders comprising a plurality of roll bearings and base plates supporting said roll bearings, and disposed between said pressing movable race and said stationary race; and d. a spring member provided on said pressing movable race to bias the same so that said stage-moving movable race and said stationary race respectively create pressure forces against said stage-moving roll bearings and that said stationary race and said pressing movable race respectively create pressure forces against said pressing roll bearings.

11. A device according to claim 1, wherein said pressing means comprises a connecting shaft, a pressing movable race movable on said stationary race and secured to said stage-moving movable race by means of said connecting shaft, and a spring member provided on said stationary race to bias said pressing movable race so that the surfaces of said stage-moving movable race and said stationary race respectively create pressure forces against said roll bearings simultaneously.

12. A device according to claim 11, wherein said spring member provided on said stationary race comprises a plate spring provided on said stationary race, and roller bearings provided on said plate spring.

13. A device according to claim 1, wherein said stage is secured to said stage-moving movable race.

14. A device according to claim 1, wherein said driving means comprises a pinion rotatably supported by said stationary member, and a rack secured to said stage-moving movable race and meshing with said pinion.

* * * * *